US008890979B2

(12) United States Patent
Sim et al.

(10) Patent No.: US 8,890,979 B2
(45) Date of Patent: Nov. 18, 2014

(54) METHODS FOR PROCESSING A COMPOSITE VIDEO IMAGE WITH FEATURE INDICATION

(75) Inventors: Wong Hoo Sim, Singapore (SG); Toh Onn Desmond Hill, Singapore (SG)

(73) Assignee: Creative Technology Ltd, Singapore (SG)

(*) Notice: Subject to any disclaimer, the term of this patent is extended or adjusted under 35 U.S.C. 154(b) by 474 days.

(21) Appl. No.: 12/676,886

(22) PCT Filed: Sep. 5, 2008

(86) PCT No.: PCT/SG2008/000331
§ 371 (c)(1),
(2), (4) Date: Mar. 5, 2010

(87) PCT Pub. No.: WO2009/031978
PCT Pub. Date: Mar. 12, 2009

(65) Prior Publication Data
US 2010/0309337 A1    Dec. 9, 2010

(30) Foreign Application Priority Data
Sep. 5, 2007    (SG) .............................. 200706524-6

(51) Int. Cl.
*H04N 5/262*    (2006.01)
*G03B 13/00*    (2006.01)

(52) U.S. Cl.
CPC .............. *G03B 13/00* (2013.01); *H04N 5/2624* (2013.01)
USPC ....................................................... 348/239

(58) Field of Classification Search
USPC ............................................. 348/239, 14.08
See application file for complete search history.

(56) References Cited

U.S. PATENT DOCUMENTS

| 5,025,314 | A  | * | 6/1991  | Tang et al. ................. 348/14.08 |
| 5,473,369 | A  | * | 12/1995 | Abe ............................. 348/169 |
| 5,781,174 | A  | * | 7/1998  | Uya et al. ..................... 345/639 |
| 6,771,303 | B2 | * | 8/2004  | Zhang et al. ............... 348/14.16 |
| 6,774,932 | B1 | * | 8/2004  | Ewing et al. ................. 348/157 |
| 6,806,898 | B1 | * | 10/2004 | Toyama et al. ............ 348/14.16 |
| 6,816,625 | B2 | * | 11/2004 | Lewis et al. .................. 382/275 |
| 7,184,574 | B1 | * | 2/2007  | Zahavi ......................... 382/103 |
| 7,502,018 | B2 | * | 3/2009  | Tamura ........................ 345/179 |
| 7,535,486 | B2 | * | 5/2009  | Motomura et al. .......... 348/158 |
| 7,606,476 | B2 | * | 10/2009 | Toji ................................ 396/53 |
| 2003/0016285 | A1 | * | 1/2003 | Drost et al. ................... 348/125 |
| 2004/0114042 | A1 | * | 6/2004 | Paolini et al. ............ 348/207.99 |
| 2004/0119851 | A1 | * | 6/2004 | Kaku ............................ 348/239 |
| 2004/0189804 | A1 | * | 9/2004 | Borden et al. ................ 348/169 |
| 2005/0128323 | A1 | * | 6/2005 | Choi ............................. 348/239 |
| 2005/0280707 | A1 | * | 12/2005 | Sablak et al. ................ 348/155 |
| 2006/0044396 | A1 | * | 3/2006 | Miyashita et al. ....... 348/207.99 |
| 2006/0054787 | A1 | * | 3/2006 | Olsen et al. ................. 250/208.1 |
| 2006/0098729 | A1 | * | 5/2006 | Shen ........................ 375/240.01 |
| 2007/0098380 | A1 |   | 5/2007 | Spielberg |
| 2007/0109398 | A1 |   | 5/2007 | Teo |

(Continued)

*Primary Examiner* — Aung S Moe
*Assistant Examiner* — Amy Hsu
(74) *Attorney, Agent, or Firm* — Russell Swerdon; Desmund Gean (57) ABSTRACT

There is provided a first and second method for processing a composite video image. The methods generally include obtaining a first image of a scene through a first image capturing device with the composite image including a visual representation for directing a receiver's attention to at least one portion of the first image. Preferably, the visual representation may be an arm, a hand, a finger, or an object used for pointing.

17 Claims, 6 Drawing Sheets

(56) References Cited

U.S. PATENT DOCUMENTS

| | | |
|---|---|---|
| 2007/0222859 A1* | 9/2007 | Chang et al. .................. 348/148 |
| 2007/0248348 A1* | 10/2007 | Lee et al. ....................... 396/213 |
| 2008/0030592 A1* | 2/2008 | Border et al. .............. 348/218.1 |
| 2008/0084508 A1* | 4/2008 | Cole et al. ..................... 348/744 |
| 2008/0129825 A1* | 6/2008 | DeAngelis et al. ........... 348/169 |
| 2008/0266380 A1* | 10/2008 | Gorzynski et al. ......... 348/14.08 |
| 2008/0297586 A1* | 12/2008 | Kurtz et al. ................ 348/14.08 |
| 2010/0134642 A1* | 6/2010 | Thorn ........................ 348/222.1 |

* cited by examiner

METHODS FOR PROCESSING A COMPOSITE VIDEO IMAGE WITH FEATURE INDICATION

FIELD OF INVENTION

The present invention relates to the field of processing a video image, including methods of processing a composite image which includes a visual indication of at least one feature in the composite image.

BACKGROUND

The ready availability and affordability of broadband internet access globally has led to an exponential increase in the adoption of communication methods like video messaging and video conferencing. The variety and availability of free software enabling such communication methods from companies like Microsoft, Yahoo, Skype, and America Online also aid in increasing the popularity of such communication methods. Currently, there are also an increasing number of devices which are used for video conferencing. These devices may or may not employ the aforementioned communication software for video conferencing.

Generally, during video conferencing, parties who are communicating with each other only see one another. There are certain inconveniences for a first party to highlight/point out to the second party features relating to objects which are outside a field of view of an image capture device in a video conferencing device, while still being able to see one another. This limitation may cause some problems during certain instances of communication between the parties.

SUMMARY

In a first aspect, there is provided a method for processing a composite video image. The method includes obtaining a first image of a scene through a first image capturing device with the first image including a visual representation for directing a receiver's attention to at least one portion of the first image. A second image of an appearance of a user of a second image capturing device is also obtained through the second image capturing device. The second image is preferably obtained simultaneously when obtaining the first image. The second image may be either a face or an upper torso of the user of the second image capturing device.

A composite image that includes both the first image and the second image is subsequently generated, the first image making up a substantial proportion of the composite image with the second image being located at a position to create a perception that the user is making the visual representation to the receiver. The composite image is then transmitted to the receiver. The composite image may undergo perspective gaze correction before transmission to the receiver, with the gaze corrected image being akin to the user of the second image capturing device looking upon the scene of the first image.

It is preferable that the first image capturing device and second image capturing device include a lens of a type such as, for example, standard (50 mm), wide-angle or fish eye. The at least one of the first and second image capturing devices have either a fixed or variable field of view. A first field of view of the first image capturing device and a second field of view of the second image capturing device may or may not overlap.

Preferably, the visual representation may be an arm, a hand, a finger, or an object used for pointing. The visual representation may be visually enhanced using wavefront coding to enable it to appear as an optically focused object.

It is preferable that the first image capturing device and the second image capturing device are integrated in a single apparatus, the single apparatus being, for example, a handheld media player, a mobile phone, a handheld digital camera, a webcam and the like.

There is provided an alternative method for processing a composite video image. The method includes obtaining a first image of a scene through a first lens of a first image capturing device; using a preview image of the first image and overlaying a visual representation for directing a receiver's attention to at least one portion of the scene on the preview image; the first image capturing device focus-locking on at least one portion of the first image, with the focus-lock enabling movement of the visual representation when a field of view of the first image capturing device is varied. A composite image that includes the visual representation is then generated and transmitted to the receiver.

The first lens may be a type such as, for example, standard (50 mm), wide-angle, fish eye and the like. The first image capturing device may have either a fixed or variable field of view. It is preferable that the visual representation is of a form such as, for example, an arrow, a cross hair, a pointer, a cross and so forth. The focus-lock may preferably maintain a position of at least one portion of the first image in the preview image.

The variation of the field of view of the first image capturing device may be detected using techniques for detecting movement of the first image capturing device such as, for example, an electronic compass for detecting horizontal panning using bearings, an inertial meter for detecting vertical tilting, a tilt sensor for detecting vertical tilting, optical flow analysis for detecting specific pixel movements and the like.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
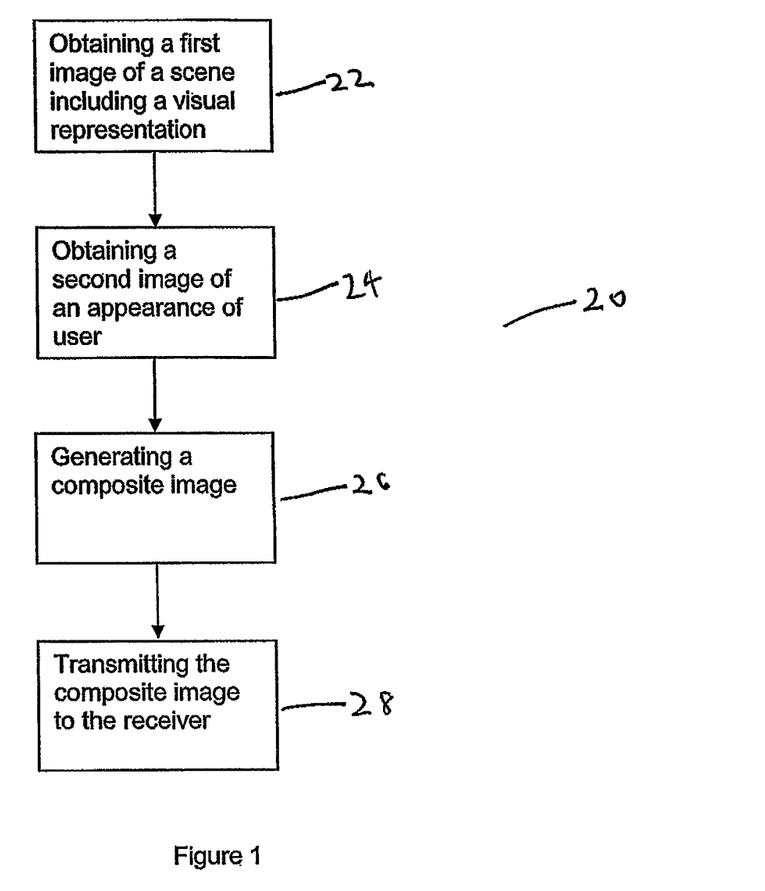
FIG. 1 shows a process flow of a first embodiment of the present invention.
Figure 7:
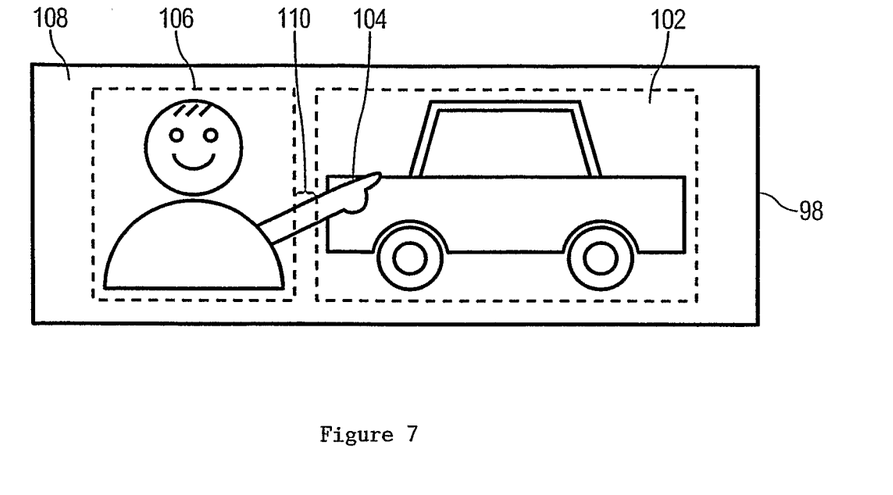
FIG. 7 shows a first example of a composite video image resulting from a preferred embodiment.
Figure 8:
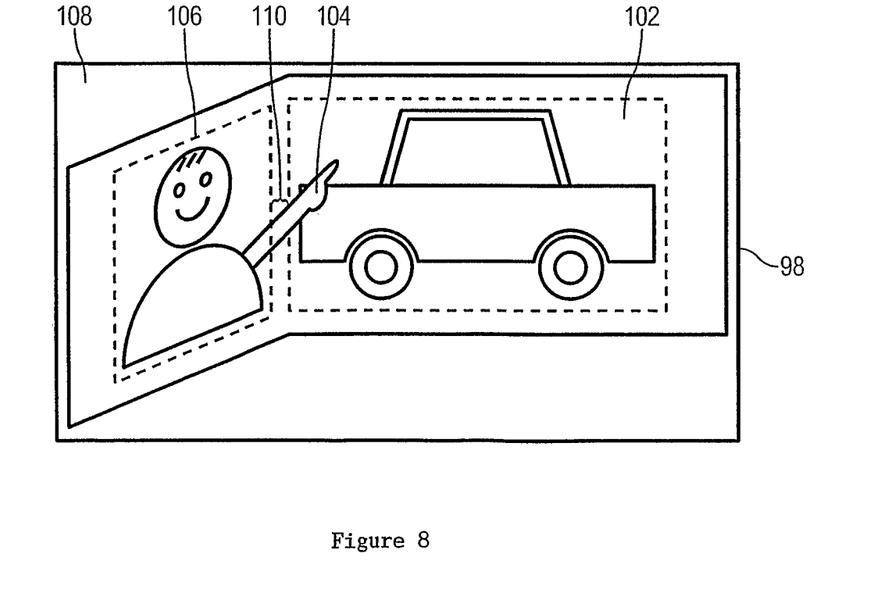
FIG. 8 shows a second example of a composite video image resulting from a preferred embodiment.

There is shown in FIG. 1 a process flow denoting a method 20 for processing a composite video image. FIGS. 7 and 8 denote examples of the composite video image 98. The method 20 includes obtaining a first image 102 of a scene through a first image capturing device (22). The first image 102 may include a visual representation 104 for directing a receiver's attention to at least one portion of the first image 102. The visual representation 104 may be of a form such as, for example, an arm (as shown in FIGS. 7 and 8), a hand, a finger, an object used for pointing and the like.

A second image 106 of an appearance of a user of a second image capturing device may be obtained through a second image capturing device (24). It should be noted that the first image 102 may be obtained after obtaining the second image 106. The order of obtaining the first image 102 and the second image 106 is variable. The second image 106 may also be obtained simultaneously when obtaining the first image 102. The first and second image capturing devices may include lenses of a type such as, for example, standard (50 mm), wide-angle, fish eye and the like. At least one of the first and second image capturing devices may have a fixed field of view. Similarly, at least one of the first and second image capturing devices may have a variable field of view. Further discussion of the first and second image capturing devices will be provided in a subsequent portion of the description. Both the first image capturing device and the second image capturing device may be integrated in a single apparatus, the single apparatus may be, for example, a handheld media player, a mobile phone, a handheld digital camera, a webcam and the like.

Subsequently, a composite image 98 is generated (26) that includes both the first image 102 and the second image 106. The first image 102 may make up a substantial proportion of the composite image 98 with the second image 106 being located at a position to create a perception that the user of the second image capturing device is making the visual representation 104 to the receiver.

Referring to FIG. 7, it can be seen that the user of the second image capturing device is making a visual representation (pointing) to a car. The second image 106 may be either a face or an upper torso of the user of the second image capturing device. FIG. 7 shows an upper torso of the user of the second image capturing device. When the second image 106 is only a face, the face may be superimposed onto a shape that may be humanoid in form. For example, the face may be superimposed to replace a head of a fictional cartoon character, or the face may be superimposed onto a fruit and so forth. In FIG. 7, the second image 106 is shown in a first side 108 of the composite image 98. The second image 106 may be in another portion of the composite image 98 as a location of the user of the second image capturing device in the composite image is dependent on the positioning of the visual representation 104 in the first image 102. The second image 106 may be joined 110, preferably seamlessly, to the visual representation 104 using known image filling methods for non-overlapping regions. The second image 106 may even be moving about the composite image 98 if the positioning of the visual representation 104 continually changes. The visual representation 104 may be visually enhanced using wavefront coding (commonly employed in microscopes and endoscopes) to enable it to appear as an optically focused object as it may be out of focus when compared to the first image 102.

Referring to FIG. 8, there is shown the composite image 98 which has undergone gaze correction. The gaze correction of the composite image 98 provides a receiver with a view akin to the user of the second image capturing device looking upon the scene of the first image 102. The gaze correction is generally performed before transmission to the receiver. The composite image 98 which undergoes gaze correction creates an appearance of the user of the second image capturing device presenting/pointing out features on the first image 102 to the receiver. In FIG. 8, the second image 106 is shown in a first side 108 of the composite image 98. The second image 106 may be in another portion of the composite image 98 as a location of the second image 106 in the gaze corrected composite image is dependent on the positioning of the visual representation 104 in the first image 102. The second image 106 may be joined 110, preferably seamlessly, to the visual representation 104 using known image filling methods for non-overlapping regions. The second image 106 may even be moving about the composite image 98 if the positioning of the visual representation 104 continually changes. The visual representation 104 may be visually enhanced to enable it to appear as an optically focused object as it may be out of focus when compared to the first image 102.

Finally, the composite image 98 may be transmitted to the receiver (28). The receiver is thus able to view the composite image 98 in which the user of the second image capturing device is able to indicate features within the first image 102 which aid in communication with the receiver.

Figure 3:
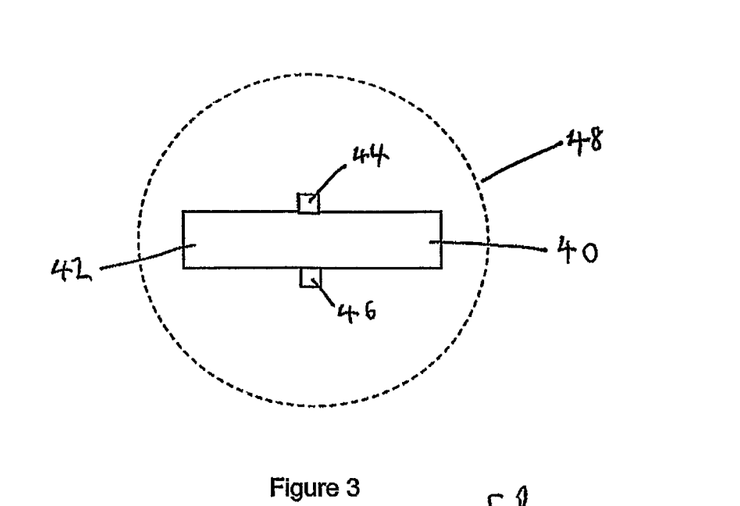
FIG. 3 shows a first setup for an apparatus used in a preferred embodiment.

Referring to FIGS. 3-6, there are shown some examples of the apparatus with dual image capturing devices that may be used in the method 20. As mentioned earlier, the apparatus may be for example, a handheld media player, a mobile phone, a handheld digital camera, a webcam and the like. FIG. 3 shows a first example of apparatus 40. The apparatus 40 includes a main body 42 which contains a first image capturing device 44 and a second image capturing device 46. In the first example of the apparatus 40, both the first image capturing device 44 and the second image capturing device 46 utilise wide angle/fish eye lenses. In such an instance, a combination of the images captured by the first image capturing device 44 and the second image capturing device 46 provides a substantially 360° field of view 48 around the apparatus 40. Given that some wide angle lens have fields of view of up to 200°, fields of view of the first image capturing device 44 and the second image capturing device 46 may overlap. In the instance when the fields of view overlap, image filling methods may not need to employed to join the visual representation 104 in first image 102 to the second image 106 in the composite image 98. However, distortion correction may still be applied to the composite image 98.

Figure 4:
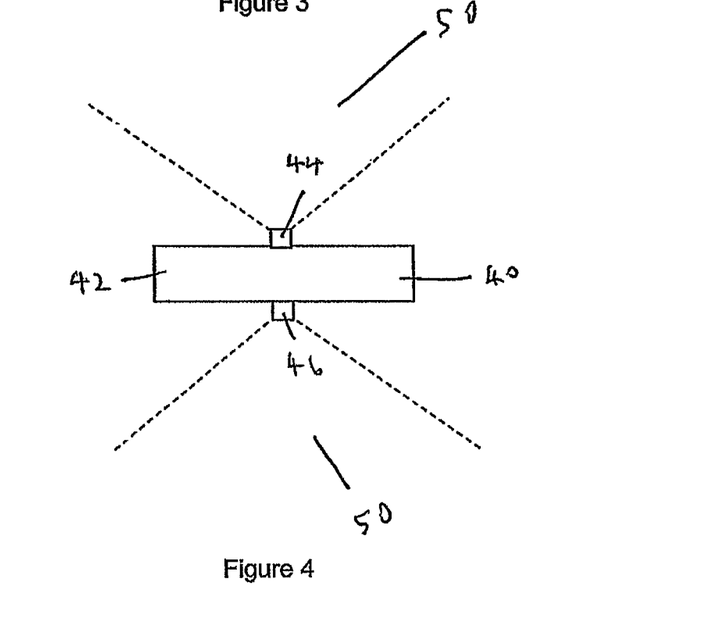
FIG. 4 shows a second setup for the apparatus used in a preferred embodiment.

FIG. 4 shows a second example of apparatus 40. The apparatus 40 includes a main body 42 which contains a first image capturing device 44 and a second image capturing device 46. In the second example of the apparatus 40, both the first image capturing device 44 and the second image capturing device 46 utilise standard (50 mm) lenses. In such an instance, both the first image capturing device 44 and the second image capturing device 46 may have a field of view 50 of between 120°-160°. In this second example, it is apparent that the fields of view of the first image capturing device 44 and the second image capturing device 46 do not overlap. In the instance when the fields of view do not overlap, image filling methods may be employed to join the visual representation 104 in first image 102 to the second image 106 in the composite image 98. Distortion correction may still be applied to the composite image 98.

Figure 5:
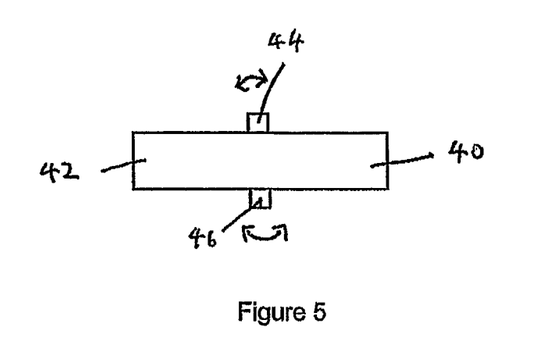
FIG. 5 shows a third setup for the apparatus used in a preferred embodiment.

FIG. 5 shows a third example of apparatus 40. The apparatus 40 includes a main body 42 which contains a first image capturing device 44 and a second image capturing device 46. In the third example of the apparatus 40, both the first image capturing device 44 and the second image capturing device 46 may utilise lenses, such as, for example, standard (50 mm), wide-angle, fish eye and the like. The first image capturing device 44 need not utilize an identical lens with the second image capturing device 46. However, in this instance, the field of view of the first image capturing device 44 and the second image capturing device 46 does not depend solely on the lens. This is because the first image capturing device 44 and the second image capturing device 46 may swivel/pan. In this instance the fields of view may or may not overlap.

Figure 6:
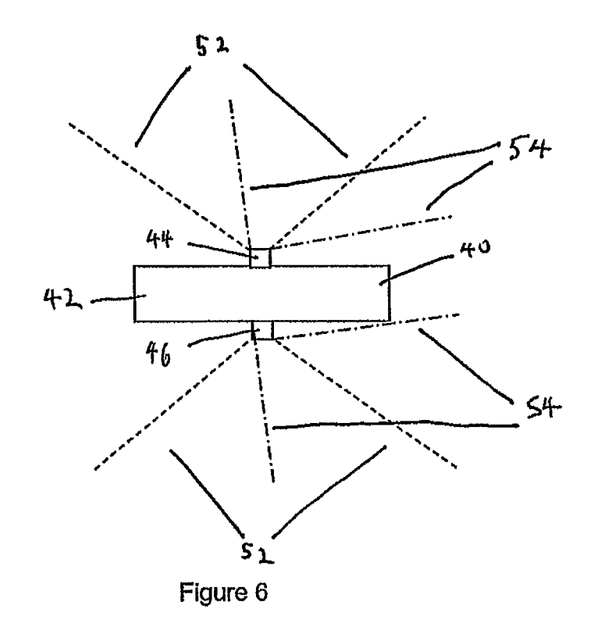
FIG. 6 shows a fourth setup for the apparatus used in a preferred embodiment.

FIG. 6 shows a fourth example of apparatus 40. The apparatus 40 includes a main body 42 which contains a first image capturing device 44 and a second image capturing device 46. In the fourth example of the apparatus 40, both the first image capturing device 44 and the second image capturing device 46 may utilise lenses, such as, for example, standard (50 mm), wide-angle, fish eye and the like. The first image capturing device 44 need not utilize an identical lens with the second image capturing device 46. In this instance, the field of view of the first image capturing device 44 and the second image capturing device 46 also does not depend solely on the lens. This is because the first image capturing device 44 and the second image capturing device 46 may include software to digitally swivel/pan the respective fields of view from a first state 52 to a second state 54. In the instance the fields of view may or may not overlap.

Referring to FIGS. 2 and 9A-9C, there is provided an alternative method 60 for processing a composite video image. The method 60 includes obtaining a first image 202 of a scene (62) through a first lens 203 of a first image capturing device 204. The first image capturing device 204 may be similar to the apparatus 40 as mentioned earlier. This is depicted in window 200 of FIG. 9A. The first lens 203 of the first image capturing device 204 may be of a type such as, for example, standard (50 mm), wide-angle, fish eye and the like. The first image capturing device 204 may have either a fixed or variable field of view.

Figure 2:
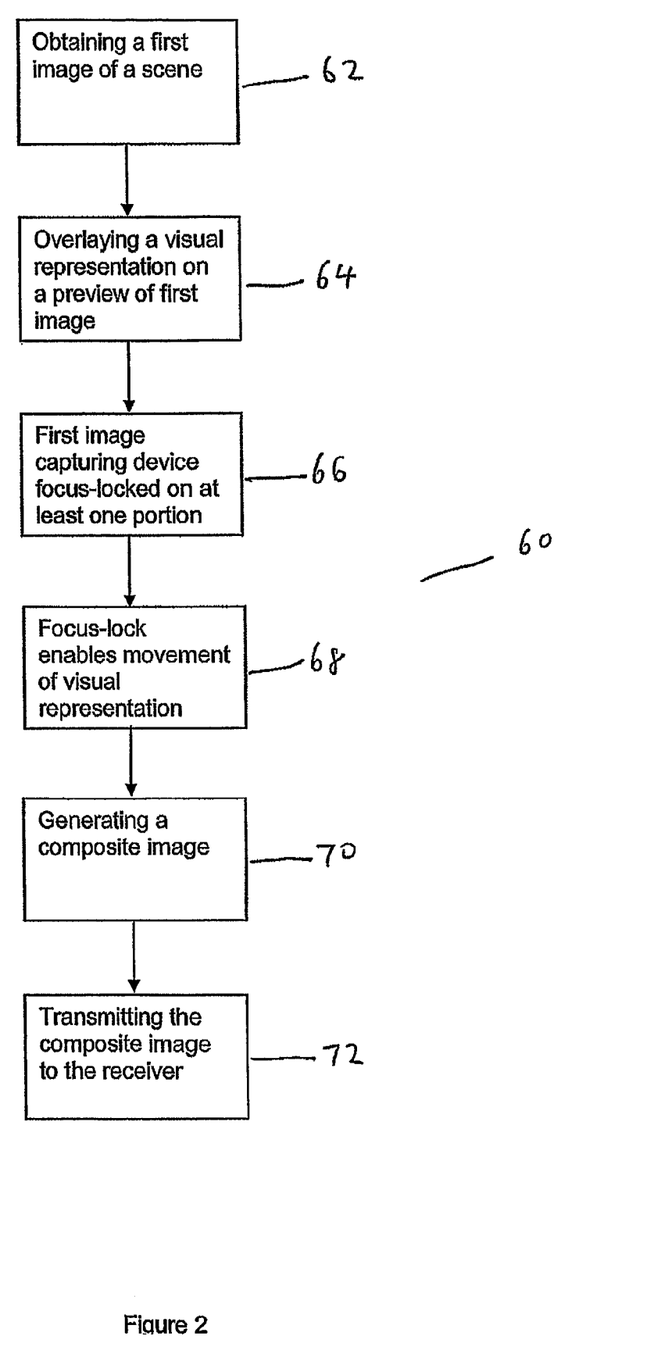
FIG. 2 shows a process flow of a second embodiment of the present invention.

A visual representation 206 for directing a receiver's attention to at least one portion of the scene is overlaid on a preview image 208 (64). The preview image 208 may be cropped 210 from the first image 202. The visual representation 206 is shown to be a cross hair, but may also be, for example, an arrow, a cross, a pointer and the like. The visual representation 206 may be moved about in the preview image 208 using controls on the first image capturing device 204. Alternatively, the preview image 208 may be shown on a touch-sensitive display and the visual representation 206 is moved about using a sense of touch on the touch-sensitive display.

Figure 9A:
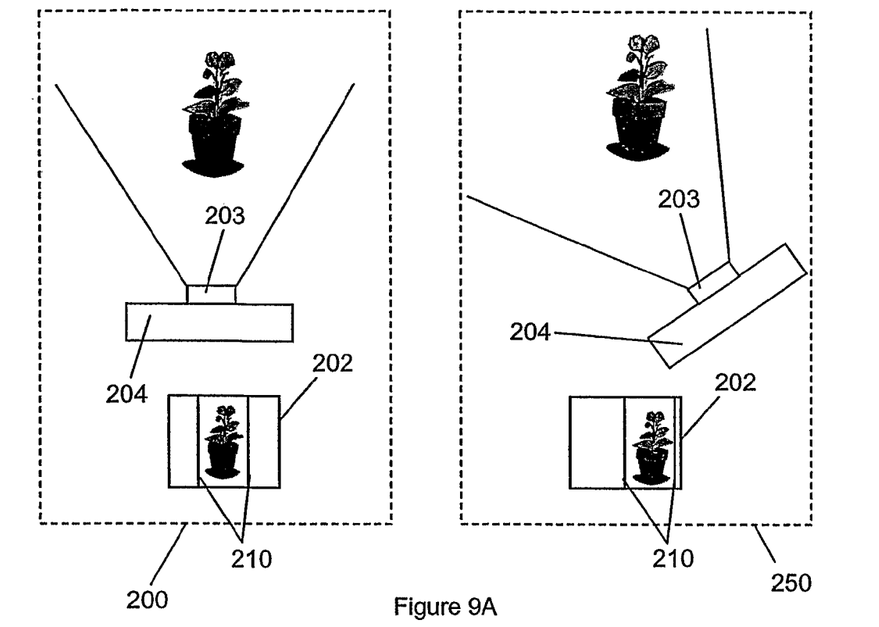
FIG. 9 shows a representation of the second embodiment when in use.
Figure 9B:
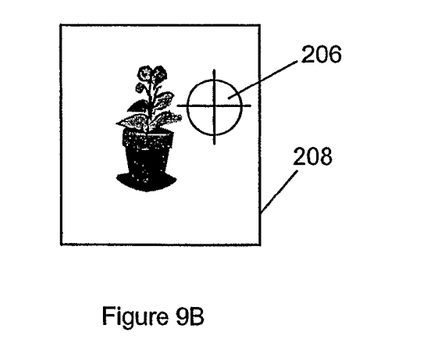

The first image capturing device 204 is focus-locked (66) on at least one portion of the first image 202 (a flower pot as shown in FIG. 9). The focus-lock enables movement of the visual representation (68) when a field of view of the first image capturing device 204 is varied. Varying the field of view of the first image capturing device 204 is depicted in window 250 of FIG. 9A. In window 250, the first image capturing device 204 has been moved from the position as shown in window 200. The first image capturing device 204 may detect movement using for example, an electronic compass for detecting horizontal panning using bearings, an inertial meter for detecting vertical tilting, a tilt sensor for detecting vertical tilting, optical flow analysis for detecting specific pixel movements and the like. When movement is detected, variation in the field of view is correspondingly ascertained.

Figure 9C:
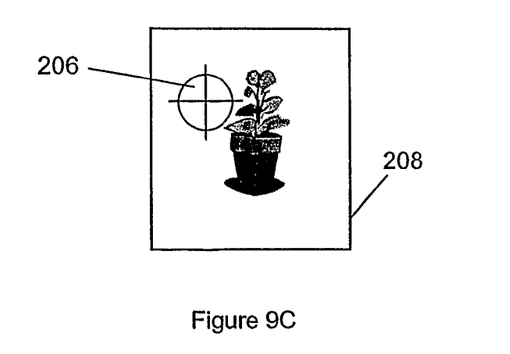

Based on a comparison of window 200 and window 250, it can be seen that the field of view of the first image capturing device 204 has shifted left-wards (panning). Consequently, the flower pot in the first image 202 is moved to the right, but due to the focus-lock, the flower pot in the first image 202 appears to be stationary. This is shown in FIG. 9C. It can be seen from FIG. 9C that the visual representation 206 is moved leftwards compared to its position in FIG. 9B. The effect is similar to the overlay with the visual representation 206 being stationary while the first image 202 is moved rightwards. Alternatively, the focus-lock may entail capturing a still image of the flower pot in the first image 202, with movement of the visual representation 206 being controlled by movement of the first image capturing device 204.

The user of the first image capturing device 204 may pan the first image capturing device 204 leftwards to cause the visual representation 206 to move leftwards. It can be seen that such a process is intuitive in nature. While the example shown relates to panning of the first image capturing device 204, it should be noted that the method 60 also covers tilting of the first image capturing device 204.

Subsequently, a composite image identical to the preview image 208 is generated (70) that includes both the first image 202 and the visual representation 206. Finally, the composite image may be transmitted to the receiver (72). The receiver is thus able to view the composite image 98 in which the user of the first image capturing device 204 is able to indicate features within the first image 202 which aid in communication with the receiver.

Whilst there has been described in the foregoing description preferred embodiments of the present invention, it will be understood by those skilled in the technology concerned that many variations or modifications in details of design or construction may be made without departing from the present invention.

The invention claimed is:

1. A method for processing a composite video image, the method including:
    obtaining a first image of a scene through a first image capturing device, the first image including a visual representation for directing a receiver's attention to at least one portion of the first image;
    obtaining a second image of an appearance of a user of a second image capturing device through the second image capturing device;
    generating a composite image that includes both the first image and the second image, the first image making up a substantial proportion of the composite image with the second image being located at a position to create a perception that the user is personally present in a visible form when making the visual representation to the receiver; and
    transmitting the composite image to the receiver,
    wherein the location of the user in the composite image is dependent on the positioning of the visual representation in the first image and the visual representation is joined seamlessly to the second image, and
    wherein the second image is movable in accordance with change in positioning of the visual representation in the first image.

2. The method as claimed in claim 1, wherein the first image capturing device and second image capturing device include a lens of a type selected from the group consisting of: standard (50 mm), wide-angle and fish eye.

3. The method as claimed in claim 1, wherein at least one of the first and second image capturing devices have a fixed field of view.

4. The method as claimed in claim 1, wherein at least one of the first and second image capturing devices have a variable field of view.

5. The method as claimed in claim 1, wherein the visual representation is of a form selected from the group consisting of: an arm, a hand, a finger, and an object used for pointing.

6. The method as claimed in claim 1, wherein the visual representation is visually enhanced using wavefront coding to enable it to appear as an optically focused object.

7. The method as claimed in claim 1, wherein a first field of view of the first image capturing device and a second field of view of the second image capturing device do not overlap.

8. The method as claimed in claim 1, wherein a first field of view of the first image capturing device and a second field of view of the second image capturing device overlap.

9. The method as claimed in claim 1, wherein the second image is obtained simultaneously when obtaining the first image.

10. The method as claimed in claim 1, wherein the first image capturing device and the second image capturing device are integrated in a single apparatus, the single apparatus selected from the group consisting of: a handheld media player, a mobile phone, a handheld digital camera, and a webcam.

11. The method as claimed in claim 1, wherein the composite image undergoes gaze correction before transmission to the receiver, a gaze corrected image being akin to the user of the second image capturing device looking upon the scene of the first image.

12. The method as claimed in claim 1, wherein the second image is either a face or an upper torso of the user of the second image capturing device.

13. A method for processing a composite video image, the method including:
- obtaining a first image of a scene through a first lens of a first image capturing device;
- using a preview image of the first image and overlaying a visual representation for directing a receiver's attention to at least one portion of the scene on the preview image;
- the first image capturing device being focus-locked on at least one portion of the first image;
- the focus-lock enabling movement of the visual representation when a field of view of the first image capturing device is varied;
- showing the preview image with the overlaid visual representation, wherein movement of the visual representation is visually perceivable;
- generating a composite image that includes the visual representation; and
- transmitting the composite image to the receiver,
- wherein without the focus-lock, the at least one portion of the first image is visually perceivable to be moved in accordance with variance in the field of view of the first image capturing device, and
- wherein due to the focus-lock, the at least one portion of the first image is visually perceivable to remain substantially stationary despite variance in the field of view of the first image capturing device whereas the visual representation is visually perceivable to move in accordance with variance in the field of view of the first image capturing device.

14. The method as claimed in claim 13, wherein the first lens is of a type selected from the group consisting of: standard (50 mm), wide-angle and fish eye.

15. The method as claimed in claim 13, wherein the first image capturing device has either a fixed or variable field of view.

16. The method as claimed in claim 13, wherein the visual representation is of a form selected from the group consisting of: an arrow, a cross hair, a pointer and a cross.

17. The method as claimed in claim 13, wherein the variation of the field of view of the first image capturing device is detected using techniques for detecting movement of the first image capturing device selected from the group consisting of: an electronic compass for detecting horizontal panning using bearings, an inertial meter for detecting vertical tilting, a tilt sensor for detecting vertical tilting, and optical flow analysis for detecting specific pixel movements.

\* \* \* \* \*